United States Patent
Venkata et al.

(10) Patent No.: US 10,083,026 B1
(45) Date of Patent: Sep. 25, 2018

(54) IN-SERVICE SOFTWARE UPGRADE OF SOFTWARE-DEFINED NETWORKING CONTROLLER

(71) Applicant: Juniper Networks, Inc., Sunnyvale, CA (US)

(72) Inventors: Suresh Kumar Vinapamula Venkata, Santa Clara, CA (US); Ashish Ranjan, San Ramon, CA (US); Hampapur Ajay, Sunnyvale, CA (US); Sachin Bansal, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 91 days.

(21) Appl. No.: 15/087,286

(22) Filed: Mar. 31, 2016

(51) Int. Cl.
| | |
|---|---|
| G06F 9/44 | (2018.01) |
| G06F 8/656 | (2018.01) |
| G06F 8/65 | (2018.01) |
| H04L 29/08 | (2006.01) |
| H04L 12/713 | (2013.01) |
| H04L 12/24 | (2006.01) |

(52) U.S. Cl.
CPC .......... G06F 8/656 (2018.02); G06F 8/65 (2013.01); H04L 41/082 (2013.01); H04L 45/586 (2013.01); H04L 67/1097 (2013.01); H04L 67/148 (2013.01)

(58) Field of Classification Search
None
See application file for complete search history.

(56) References Cited

U.S. PATENT DOCUMENTS

| | | |
|---|---|---|
| 6,760,328 B1 | 7/2004 | Ofek |
| 7,042,838 B1 | 5/2006 | Shand et al. |
| 7,184,437 B1 | 2/2007 | Cole et al. |
| (Continued) | | |

FOREIGN PATENT DOCUMENTS

WO     2013184846 A1    12/2013

OTHER PUBLICATIONS

Laurent Vanbever, "HotSwap: Coorect and Efficient Controller Upgrades for Software-Defined Networks", Aug. 2013, ACM.*

(Continued)

*Primary Examiner* — Lewis Alexander Bullock, Jr.
*Assistant Examiner* — Mark A Gooray
(74) *Attorney, Agent, or Firm* — Shumaker & Sieffert, P.A.

(57) ABSTRACT

Techniques are disclosed describing an In-Service Software Upgrade for a Software Defined Networking (SDN) controller of a cloud data center. A cloud data center includes a first SDN controller configured to perform session management of a plurality of session instances, an orchestration engine communicatively coupled to the first SDN controller via a northbound application program interface (API); and a plurality of compute nodes configured to perform compute functions for the plurality of session instances. In response to receiving a request to perform an in-service software upgrade (ISSU) of the first SDN controller, the orchestration engine spawns a second, upgraded SDN controller on the cloud data center. An ISSU process initializes the second SDN controller and transfers session management for the plurality of session instances from the first SDN controller to the second SDN controller. Finally, the ISSU process removes the first SDN controller from the cloud data center.

17 Claims, 8 Drawing Sheets

(56) References Cited

U.S. PATENT DOCUMENTS

| | | |
|---|---|---|
| 7,519,006 B1 | 4/2009 | Wing |
| 7,937,492 B1 | 5/2011 | Kompella et al. |
| 8,339,959 B1 | 12/2012 | Moisand et al. |
| 9,641,435 B1 | 5/2017 | Sivaramakrishnan |
| 2007/0195797 A1 | 8/2007 | Patel et al. |
| 2010/0061242 A1 | 3/2010 | Sindhu et al. |
| 2016/0182351 A1* | 6/2016 | Wang ............... H04L 49/00 709/223 |
| 2016/0191306 A1* | 6/2016 | Gasparakis ........... H04L 41/082 370/419 |
| 2016/0352629 A1* | 12/2016 | Wang ............... H04L 45/38 |

OTHER PUBLICATIONS

Hopps, "Analysis of an Equal-Cost Multi-Path Algorithm," RFC 2992, Network Working Group, Nov. 2000, 8 pp.

U.S. Appl. No. 14/228,844, by Rajagopalan Sivaramakrishnan, filed Mar. 28, 2014.

"TCG Trusted Network Connection—TNC IF-MAP Binding for SOAP—Specification Version 2.1, Revision 15," Trusted Computing Group, May 7, 2012, 81 pp.

Venkata, "OpenContrail in Service Software Upgrade," GitHub, OpenContrail Blog, Jun. 16, 2016.

\* cited by examiner

IN-SERVICE SOFTWARE UPGRADE OF SOFTWARE-DEFINED NETWORKING CONTROLLER

TECHNICAL FIELD

This disclosure generally relates to the software maintenance of cloud data centers and networks.

BACKGROUND

In a typical cloud data center environment, there is a large collection of interconnected servers that provide computing (e.g., compute nodes) and/or storage capacity to run various applications. For example, a data center comprises a facility that hosts applications and services for subscribers, i.e., customers of data center. The data center for example, hosts all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Periodically, the networking and storage systems of the data center may need to be updated. For example, software installed and running on compute nodes or other devices within the data center may need to be either upgraded or replaced. Installing the software update typically requires the compute node or infrastructure device to transition offline and stop execution or management of customer applications so that the software update may be performed. During this period, customer traffic flow and customer applications executing within the cloud data center may be interrupted or entirely unavailable.

SUMMARY

Techniques are described for performing an In-Service Software Upgrade ("ISSU") of a Software-Defined Networking ("SDN") controller within a cloud data center. As described herein, the ISSU process dynamically and in real time spawns a second, virtual SDN controller for the network. Moreover, the original SDN controller and the second, virtual SDN controller are configured to operate in parallel and to continuously synchronize network state information. After the original SDN controller and second, virtual SDN controller are synchronized, the ISSU process seamlessly transitions individual compute nodes managed by the original SDN controller, along with their corresponding virtual routers, to management by the second, virtual SDN controller. After the ISSU process has migrated the compute nodes, it deallocates the original SDN controller. Thus, a cloud data center according to the techniques of the disclosure may upgrade an SDN controller while ensuring customer traffic flow and customer applications executing within the cloud data center continue without interruption.

In one example, this disclosure describes a method including: on at least one processor of a cloud data center executing a first Software Defined Networking (SDN) controller configured to perform session management of a plurality of session instances, wherein the cloud data center further includes: an orchestration engine communicatively coupled to the first SDN controller via a first northbound application program interface (API); and a plurality of compute nodes configured to perform compute functions for the plurality of session instances, wherein each of the plurality of compute nodes include: a virtual router, wherein each virtual router is communicatively coupled to the first SDN controller via a southbound API; and at least one virtual machine configured to execute at least one session instance of the plurality of session instances; in response to receiving a request to perform an in-service software upgrade (ISSU) of the first SDN controller, initializing a second SDN controller on the cloud data center; and after initializing the second SDN controller, transferring session management for the plurality of session instances from the first SDN controller to the second SDN controller.

In another example, this disclosure describes a second Software Defined Networking (SDN) controller of a cloud data center, configured to: receive a request, from an orchestration engine, to perform an in-service software upgrade (ISSU) of a first SDN controller, wherein the orchestration engine is communicatively coupled to the first SDN controller via a first northbound application program interface (API), the first SDN controller is configured to perform session management of a plurality of session instances, and the cloud data center further includes: a plurality of compute nodes configured to perform compute functions for the plurality of session instances, wherein each of the plurality of compute nodes include: a virtual router, wherein each virtual router is communicatively coupled to the first SDN controller via a southbound API; and at least one virtual machine configured to execute at least one session instance of the plurality of session instances; in response to receiving the request, initialize the second SDN controller; and after initializing the second SDN controller, transfer session management for the plurality of session instances from the first SDN controller to the second SDN controller.

In another example, this disclosure describes a non-transitory computer-readable medium comprising instructions for causing at least one programmable processor of a second Software Defined Networking (SDN) controller of a cloud data center to: receive a request, from an orchestration engine, to perform an in-service software upgrade (ISSU) of a first SDN controller, wherein the orchestration engine is communicatively coupled to the first SDN controller via a first northbound application program interface (API), the first SDN controller is configured to perform session management of a plurality of session instances, and the cloud data center further includes: a plurality of compute nodes configured to perform compute functions for the plurality of session instances, wherein each of the plurality of compute nodes include: a virtual router, wherein each virtual router is communicatively coupled to the first SDN controller via a southbound API; and at least one virtual machine configured to execute at least one session instance of the plurality of session instances; in response to receiving the request, initialize the second SDN controller; and after initializing the second SDN controller, transfer session management for the plurality of session instances from the first SDN controller to the second SDN controller.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
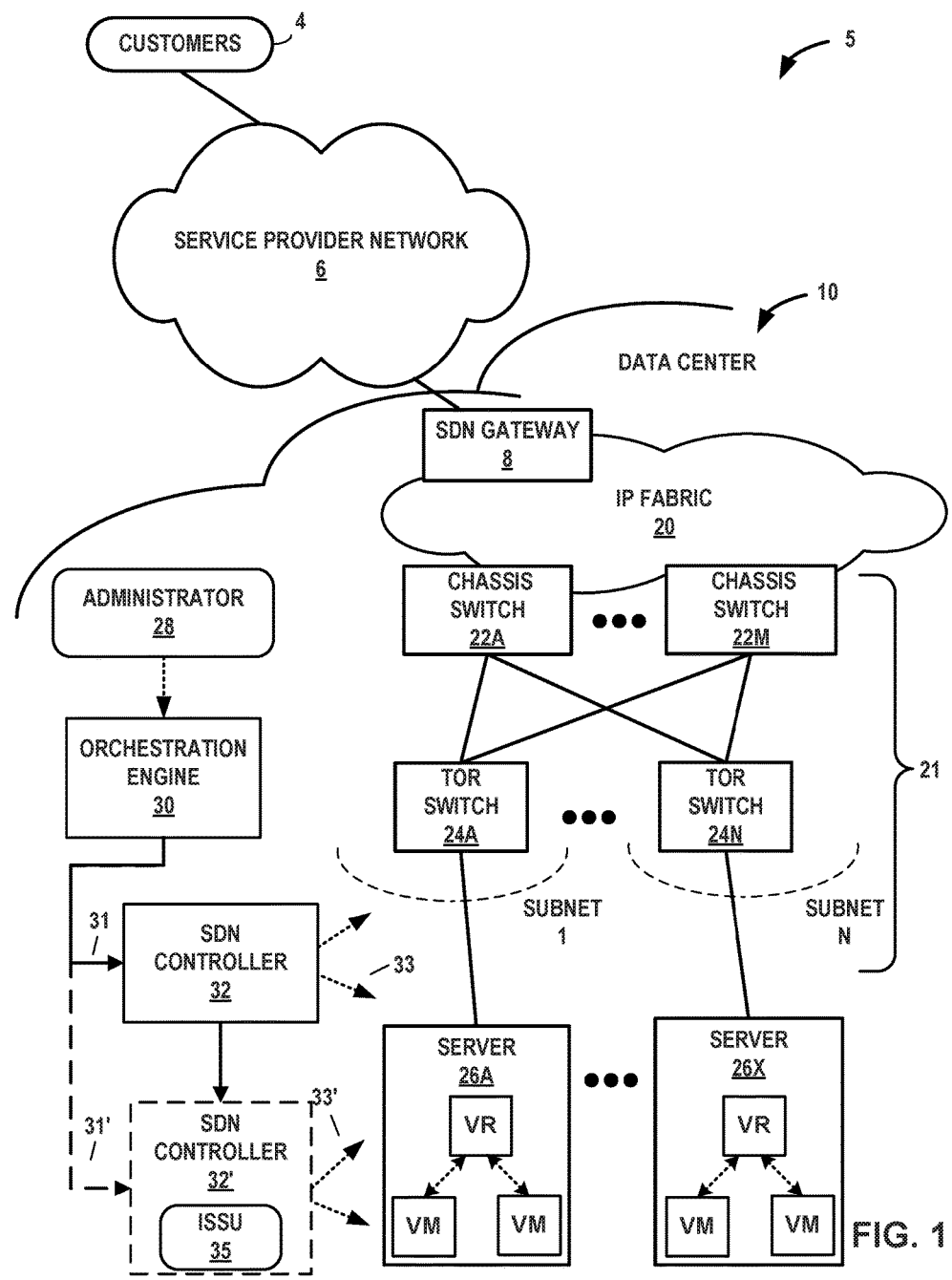
FIG. 1 is a block diagram illustrating an example network having a data center in which examples of the techniques described herein may be implemented.

FIG. 1 is a block diagram illustrating an example network 5 in which SDN controller 32 undergoes an ISSU in accordance with the techniques described herein so as to seamlessly upgrade the software of SDN controller 32 while ensuring customer traffic flow and customer applications executing within the cloud data center continue without interruption. In general, administrator 28 instructs orchestration engine 30 to instantiate a second SDN controller 32' executing ISSU process 35. ISSU process 35 instructs SDN controller to copy the configuration of SDN controller 32 to SDN controller 32'. Then ISSU process 35 migrates servers 26A-26X from SDN controller 32 to SDN controller 32'. Finally, ISSU process 35 removes SDN controller 32 and terminates.

In general, data center 10 provides an operating environment for applications and services for customers 4 coupled to the data center 10 by service provider network 6. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers 26A-26X (herein, "servers 26") interconnected via high-speed switch fabric 21 provided by one or more tiers of physical network switches and routers. Servers 26 function as compute nodes of the data center. For example, each of servers 26 may provide an operating environment for execution of one or more customer-specific virtual machines ("VMs" in FIG. 1). Switch fabric 21 is provided by a set of interconnected top-of-rack (TOR) switches 24A-24N (collectively, "TOR switches 24") coupled to a distribution layer of chassis switches 22A-22M (collectively, "chassis switches 22"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 24 and chassis switches 22 provide servers 26 with redundant (multi-homed) connectivity to IP fabric 20. Chassis switches 22 aggregate traffic flows and provides high-speed connectivity between TOR switches 24. TOR switches 24 are network devices that provide layer two (e.g., MAC) and/or layer 3 (e.g., IP) routing and/or switching functionality. TOR switches 24 and chassis switches 22 each include one or more processors and a memory, and that are capable of executing one or more software processes. Chassis switches 22 are coupled to IP fabric 20, which performs layer 3 routing to route network traffic between data center 10 and customers 4 by service provider network 6. Software-Defined Network ("SDN") gateway 8 acts to forward and receive packets between IP fabric 20 and service provider network 6.

Software-Defined Networking ("SDN") controller 32 provides a logically and in some cases physically centralized controller for facilitating operation of one or more virtual networks within data center 10 in accordance with one or more examples of this disclosure. The terms SDN controller and Virtual Network Controller ("VNC") may be used interchangeably throughout this disclosure. In some examples, SDN controller 32 operates in response to configuration input received from orchestration engine 30 via northbound API 31, which in turn operates in response to configuration input received from administrator 28. Additional information regarding SDN controller 32 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 30 manages functions of data center 10 such as compute, storage, networking, and application resources. For example, orchestration engine 30 may create a virtual network for a tenant within data center 10 or across data centers. Orchestration engine 30 may attach virtual machines (VMs) to a tenant's virtual network. Orchestration engine 30 may connect a tenant's virtual network to some external network, e.g. the Internet or a VPN. Orchestration engine 30 may implement a security policy across a group of VMs or to the boundary of a tenant's network. Orchestration engine 30 may deploy a network service (e.g. a load balancer) in a tenant's virtual network.

In some examples, SDN controller 32 manages the network and networking services such load balancing, security, and allocate resources from servers 26 to various applications via southbound API 33. That is, southbound API 33 represents a set of communication protocols utilized by SDN controller 32 to make the actual state of the network equal to the desired state as specified by orchestration engine 30. For example, SDN controller 32 implements high-level requests from orchestration engine 30 by configuring physical switches, e.g. TOR switches 24, chassis switches 22, and switch fabric 21; physical routers; physical service nodes such as firewalls and load balancers; and virtual services such as virtual firewalls in a VM. SDN controller 32 maintains routing, networking, and configuration information within a state database.

Typically, the traffic between any two network devices, such as between network devices within IP fabric 20 (not shown) or between servers 26 and customers 4 or between servers 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As describe herein, each of servers 26 include a respective virtual router ("VR" in FIG. 1) that executes multiple routing instances for corresponding virtual networks within data center 10 and routes the packets to appropriate virtual machines executing within the operating environment provided by the servers. Packets received by the virtual router of server 26A, for instance, from the underlying physical network fabric may include an outer header to allow the physical network fabric to tunnel the payload or "inner packet" to a physical network address for a network interface of server 26 that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 26 may receive inbound tunnel packets of a packet flow from TOR switches 24 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 26 are described in U.S. patent application Ser. No. 14/228,844, entitled "PACKET SEGMENTATION OFFLOAD FOR VIRTUAL NETWORKS," incorporated herein by reference.

In some example implementations, the virtual routers executing on servers 26 steer received inbound tunnel packets among multiple processor cores to facilitate packet processing load balancing among the cores when processing the packets for routing to one or more virtual and/or physical machines. As one example, server 26A includes multiple network interface cards and multiple processor cores to execute the virtual router and steers received packets among multiple processor cores to facilitate packet processing load balancing among the cores. For instance, a particular network interface card of server 26A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

According to the techniques of the disclosure, orchestration engine 30 dynamically and in real time spawns virtual SDN controller 32', which acts as a operating environment for ISSU process 35. ISSU process 35 configures SDN controller 32 and SDN controller 32' to operate in parallel and to continuously synchronize network state information. After SDN controller 32 and SDN controller 32' are synchronized, ISSU process 35 seamlessly transitions individual servers 26 managed by SDN controller 32, along with their corresponding virtual routers, to management by SDN controller 32'. After the ISSU process 35 has migrated servers 26, it deallocates SDN controller 32. Thus, data center 10, according to the techniques of the disclosure, upgrades SDN controller 32 without taking SDN controller 32 offline. For example, data center 10 implements an ISSU of SDN controller 32 while still providing management of the network and performing networking services such load balancing, security, and resource allocation. Therefore, data center 10 ensures customer traffic flow and customer applications executing within the cloud data center continue without interruption during an ISSU of SDN controller 32.

Figure 2:
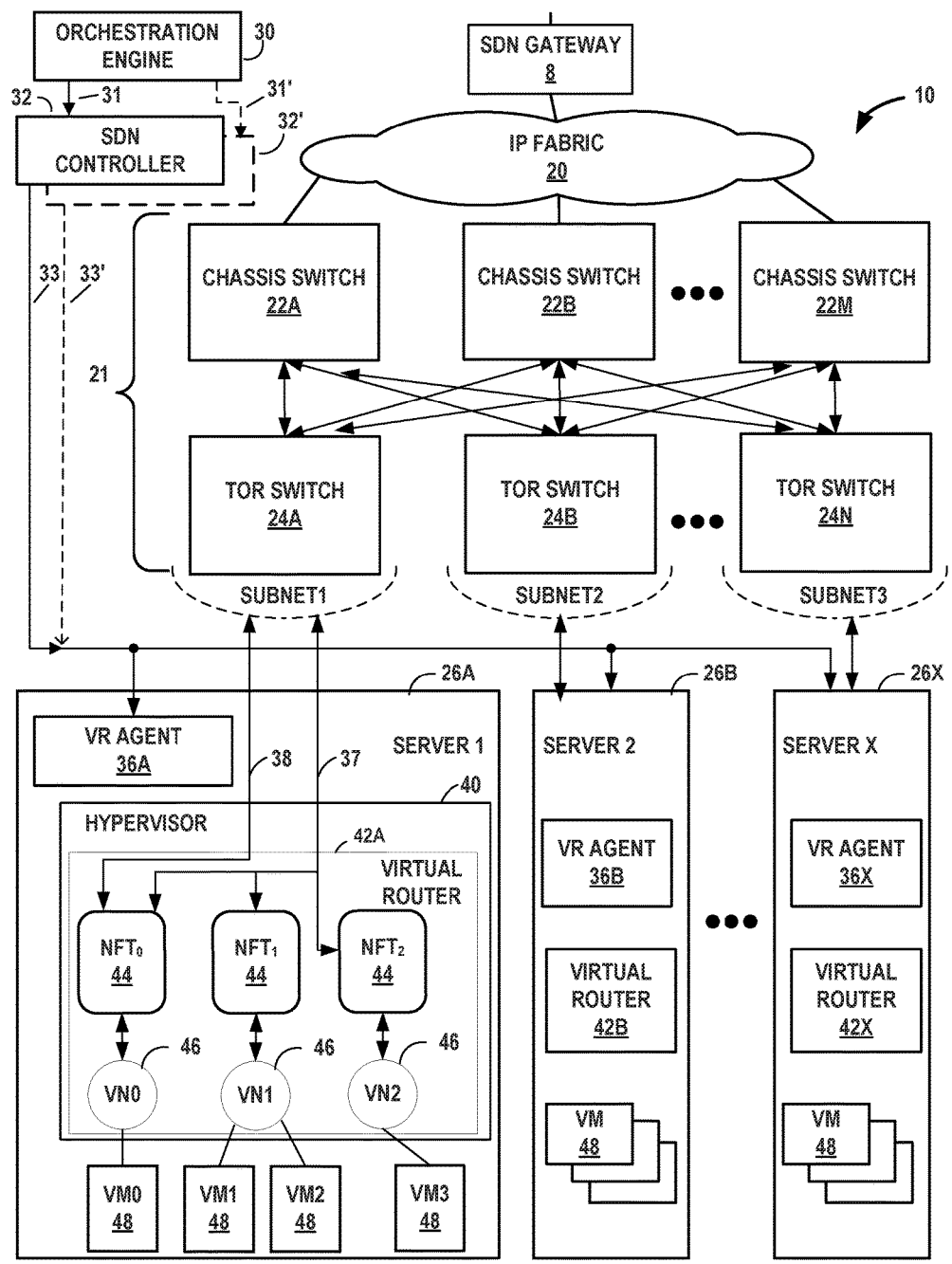
FIG. 2 is a block diagram illustrating an example implementation of the data center of FIG. 1 in further detail.

FIG. 2 is a block diagram illustrating an example implementation of data center 10 of FIG. 1 in further detail in which SDN controller 32 undergoes an ISSU with minimal impact on network virtualization functions and data flow within data center 10. In the example of FIG. 2, data center 10 includes an overlay network that extends switch fabric 21 from physical switches 22, 24 to software or "virtual" switches 42A-42X (collectively, "virtual routers 42"). Responsive to instructions received from SDN controller 32, virtual routers 42 dynamically create and manage one or more virtual networks 46 usable for communication between application instances. In one example, virtual routers 42 execute the virtual network as an overlay network, which provides the capability to decouple an application's virtual address from a physical address (e.g., IP address) of the one of servers 26A-26X ("servers 26") on which the application is executing. Each virtual network may use its own addressing and security scheme and may be viewed as orthogonal from the physical network and its addressing scheme. Various techniques may be used to transport packets within and across virtual networks 46 over the physical network. In some examples, the techniques described in this disclosure provide multicast service within virtual networks 46 without requiring multicast support in the underlying physical network.

Each virtual router 42 executes within a hypervisor, a host operating system, or other component of each of servers 26. Each of servers 26 represents an x86 or other general-purpose or special-purpose server capable of executing virtual machines 48. In the example of FIG. 2, virtual router 42A executes within hypervisor 40, also often referred to as a virtual machine manager (VMM), which provides a virtualization platform that allows multiple operating systems to concurrently run on one of servers 26. In the example of FIG. 2, virtual router 42A manages virtual networks 46, each of which provides a network environment for execution of one or more virtual machines (VMs) 48 on top of the virtualization platform provided by hypervisor 40. Each VM 48 is associated with one of the virtual networks VN0-VN1 and represents tenant VMs running customer applications such as Web servers, database servers, enterprise applications, or hosting virtualized services used to create service chains. In some cases, any one or more of servers 26 or another computing device hosts customer applications directly, i.e., not as virtual machines. Virtual machines as referenced herein, e.g., VMs 48, servers 26, or a separate computing device that hosts a customer application may be referred to alternatively as "hosts."

In general, each VM 48 may be any type of software application and is assigned a virtual address for use within a corresponding virtual network 46, where each of the virtual networks may be a different virtual subnet provided by virtual router 42A. A VM 48 may be assigned its own virtual layer three (L3) IP address, for example, for sending and receiving communications but is unaware of an IP address of the physical server 26A on which the virtual machine is executing. In this way, a "virtual address" is an address for an application that differs from the logical address for the underlying, physical computer system, e.g., server 26A in the example of FIG. 2.

In one implementation, each of servers 26 includes a corresponding one of virtual router (VR) agents 36A-36X (collectively, "VR agents 36") that communicates with SDN controller 32 and, responsive thereto, directs virtual router 42 so as to control the overlay of virtual networks 46 and coordinate the routing of data packets within server 26. In general, each VR agent 36 communicates with SDN controller 32, which generates commands to control routing of packets through data center 10. VR agents 36 execute in user space and operate as a proxy for control plane messages between VMs 48 and SDN controller 32. For example, a VM 48 may request to send a message using its virtual address via the VR agent 36A, and VR agent 36A may in turn send the message and request that a response to the message be received for the virtual address of the VM 48 that originated the first message. In some cases, a VM 48 invokes a procedure or function call presented by an application programming interface of VR agent 36A, and the VR agent 36A handles encapsulation of the message as well, including addressing.

In some example implementations, each server 26A further includes an orchestration agent (not shown in FIG. 2) that communicates directly with orchestration engine 30. For example, responsive to instructions from orchestration engine 30, the orchestration agent communicates attributes of the particular VMs 46 executing on the respective server 26, and may create or terminate individual VMs.

In one example, network packets, e.g., layer three (L3) IP packets or layer two (L2) Ethernet packets generated or consumed by the instances of applications executed by virtual machines 48 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 42, e.g., within the hypervisor or the host operating system running on each of servers 26. As another example, encapsulation and de capsulation functions is performed at the edge of switch fabric 21 at a first-hop TOR switch 24 that is one hop removed from the application instance that originated the packet. This functionality is referred to herein as tunneling and may be used within data center 10 to create one or more overlay networks. Besides IPinIP, other example tunneling protocols that may be used include IP over GRE, VxLAN, MPLS over GRE, MPLS over UDP, etc.

As noted above, SDN controller 32 provides a logically centralized controller for facilitating operation of one or more virtual networks within data center 10. For example, SDN controller 32 maintains a routing information base, e.g., one or more routing tables that store routing information for the physical network as well as one or more overlay networks of data center 10. Similarly, switches 22, 24 and virtual routers 42 maintain routing information, such as one or more routing and/or forwarding tables. In one example implementation, virtual router 42A of hypervisor 40 implements a network forwarding table (NFT) 44 for each virtual network 46. In general, each NFT 44 stores forwarding information for the corresponding virtual network 46 and identifies where data packets are to be forwarded and whether the packets are to be encapsulated in a tunneling protocol, such as with a tunnel header that may include one or more headers for different layers of the virtual network protocol stack.

For example, virtual machine VM1-48 may send an "inner packet," to virtual router 42A by an internal link. Virtual router 42A uses $NFT_1$ to look up a virtual network destination network address for the packet. $NFT_1$ specifies an outbound interface for virtual router 42A and encapsulation for the packet. Virtual router 30A applies the encapsulation to add a tunnel header to generate an outer packet and outputs the outer packet on the outbound interface, in this case toward TOR switch 24A.

The routing information, for example, maps packet key information (e.g., destination IP information and other select information from packet headers) to one or more specific next hops within the networks provided by virtual routers 42 and switch fabric 21. In some case, the next hops are chained next hop that specify a set of operations to be performed on each packet when forwarding the packet, such as may be used for flooding next hops and multicast replication. In some cases, SDN controller 32 maintains the routing information in the form of a radix tree having leaf nodes that represent destinations within the network. U.S. Pat. No. 7,184,437 provides details on an example router that utilizes a radix tree for route resolution, the contents of U.S. Pat. No. 7,184,437 being incorporated herein by reference in its entirety.

As shown in FIG. 2, each virtual network 46 provides a communication framework for encapsulated packet communications for the overlay network established through switch fabric 21. In this way, network packets associated with any of virtual machines 48 may be transported as encapsulated packet communications via the overlay network. In addition, in the example of FIG. 2, each virtual router 42 includes a default network forwarding table $NFT_0$ and provides a default route that allows a packet to be forwarded to virtual subnet VN0-46 without encapsulation, i.e., non-encapsulated packet communications per the routing rules of the physical network of data center 10. In this way, subnet VN0-46 and virtual default network forwarding table $NFT_0$ provide a mechanism for bypassing the overlay network and sending non-encapsulated packet communications to switch fabric 21.

Moreover, SDN controller 32 and virtual routers 42 communicate using virtual subnet VN0 in accordance with default network forwarding table NFT 44 during discovery and initialization of the overlay network, and during conditions where a failed link has temporarily halted communication via the overlay network. Once connectivity with the SDN controller 32 22 is established, SDN controller 32 updates its local routing table to take into account new information about any failed links and directs virtual routers 42 to update their local network forwarding tables 44. For example, SDN controller 32 outputs commands to virtual network agents 36 to update one or more NFTs 44 to direct virtual routers 42 to change the tunneling encapsulation so as to re-route communications within the overlay network, for example to avoid a failed link.

When link failure is detected, a virtual network agent 36 local to the failed link (e.g., VR agent 36A) may immediately change the encapsulation of network packet to redirect traffic within the overlay network and notifies SDN controller 32 of the routing change. In turn, SDN controller 32 updates its routing information and issues messages to other virtual network agents 36 to update local routing information stored by the virtual network agents within network forwarding tables 44.

According to the techniques of the disclosure, orchestration engine 30 receives an instruction to perform an ISSU of SDN controller 32 from administrator 28. Orchestration engine 30 spawns SDN controller 32', which may have an upgraded version of the software executing on SDN controller 32 and acts as an operating environment for ISSU process 35. ISSU process 35 then initializes SDN controller 32'. In some examples, during initialization, ISSU process 35 uses BGP peering to associate SDN controller 32' with SDN controller 32, such that SDN controller 32' may build a state database substantially similar to the state database of SDN controller 32. For example, VR agent 36A transmits messages from VMs 48 to SDN controller 32 and request that a response to the message be received for the virtual address of the VM 48 that originated the first message. SDN controller 32 stores this routing information in a state database. Because SDN controller 32' is peered to SDN controller 32, it receives identical routing information, which it uses to build its own state database.

In some examples, ISSU process 35 deactivates northbound API 31 between the SDN controller 32 and orchestration engine 30. While the northbound API 31 is deactivated, ISSU process 35 copies routing, network, and configuration information from the state database of SDN controller 32 to SDN controller 32'. ISSU process 35 then reactivates northbound API 31 between SDN controller 32 and orchestration engine 30 so that the customer service remains uninterrupted.

In some examples, ISSU process 35 migrates each of servers 26 from management by SDN controller 32 to management by SDN controller 32'. For example, for each of servers 26, ISSU process 35 deactivates southbound link 33 between SDN controller 32 and the corresponding server, and establish a new southbound link 33' between the server and SDN controller 32'. Each of VR agents 36 updates forwarding and routing information stored by the corresponding NFT 44 such that messages are forwarded to SDN controller 32' instead of SDN controller 32.

In some examples, after ISSU process 35 has migrated servers 26 managed by SDN controller 32 to SDN controller 32', ISSU process 35 deactivates northbound API 31 between the SDN controller 32 and orchestration engine 30 for a second time. ISSU process 35 ensures that all relevant state information has been transferred from SDN controller 32 to SDN controller 32'. ISSU process 35 establishes a new northbound API 31' between SDN controller 32' and orchestration engine 30. ISSU process 35 deactivates SDN controller 32 and deallocates its resources. At this point, ISSU process 35 ends and normal operations within data center 10 resume. Thus it may be seen that, according to the techniques of the present disclosure, a data center may perform an upgrade of an SDN controller while maintaining service to its customers, therefore minimizing service downtime and interruptions to its customers.

The architecture of data center 10 illustrated in FIG. 2 is shown for exemplary purposes only. The techniques as set forth in this disclosure may be implemented in the example data center 10 of FIG. 2, as well as other types of data centers not described specifically herein. Nothing in this disclosure should be construed so as to limit the techniques of this disclosure to the example architecture illustrated by FIG. 2.

Figure 3:
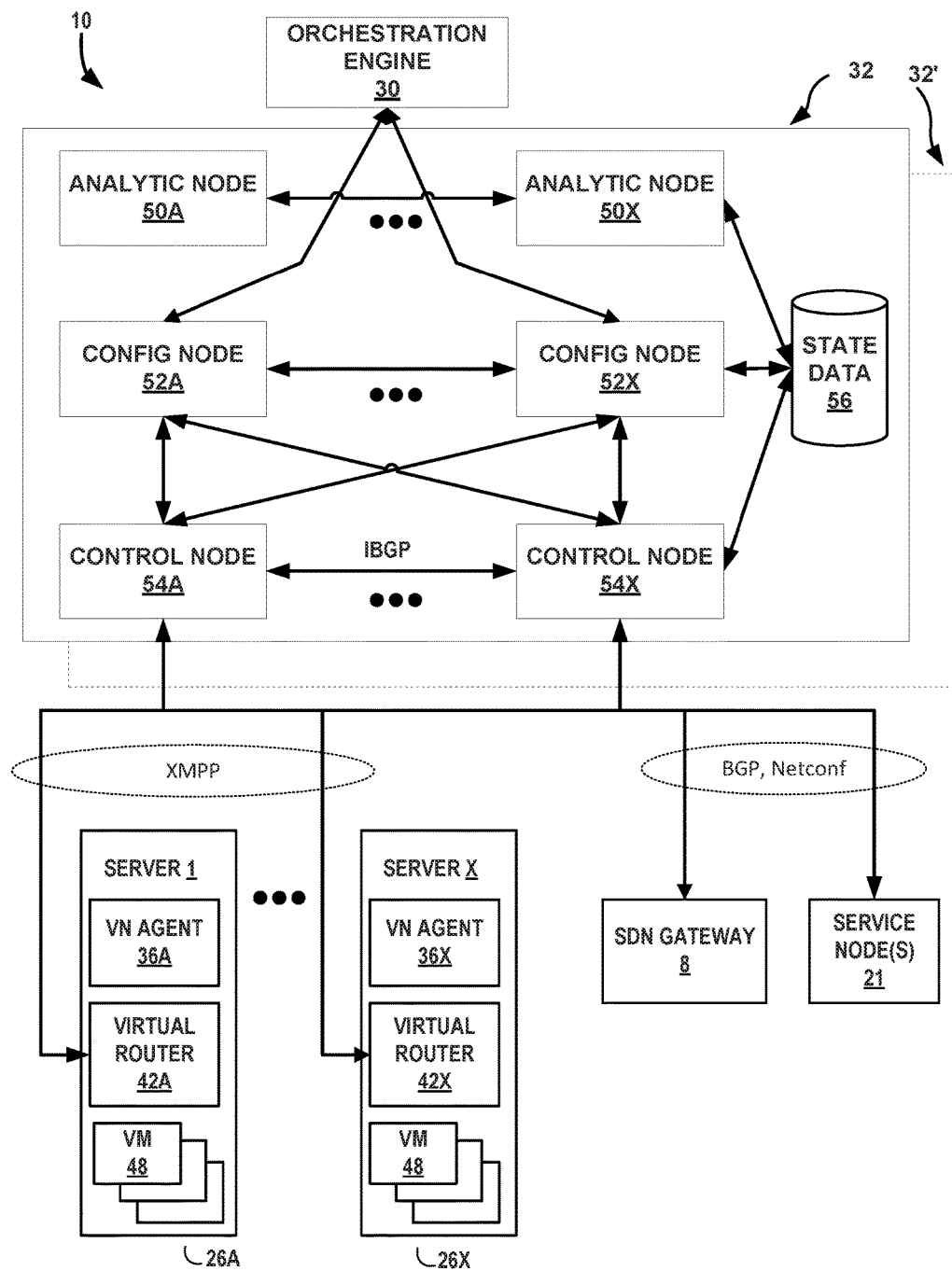
FIG. 3 is a block diagram illustrating an example implementation of the data center of FIG. 2 in further detail.

FIG. 3 is a block diagram illustrating an example implementation of the data center of FIG. 2 in further detail in which SDN controller 32 undergoes an ISSU with minimal impact on network virtualization functions and data flow within the data center 10. In the example of FIG. 3, SDN controller 32 includes one or more analytic nodes 50A-50X (collectively, "analytic nodes 50"), one or more configuration nodes 52A-52X (collectively, "configuration nodes 52") and control nodes 54A-54X (collectively, "control nodes 54"). As described herein, each of the nodes 50, 52 and 54 are seamlessly upgraded during the ISSU process so as to minimize impact of the upgrade. In general, each of the nodes 50, 52, and 52 may be implemented as a separate software process, and the nodes may be distributed across multiple hardware computing platforms that provide an environment for execution of the software. Moreover, each of the nodes maintains state data 56, which may be stored within a centralized or distributed database. In some examples, state database 56 is a NoSQL database. In some examples, state database 56 is a database cluster.

In general, analytic nodes 50 are tasked with collecting, storing, correlating, and analyzing information from virtual and physical network elements within data center 10. This information may include statistics, logs, events, and errors for use in managing the routing and network configuration of data center 10. Analytic nodes 50 store this information in state database 56.

Configuration nodes 52 translate the high-level data model of orchestration engine 30 into lower level models suitable for interacting with network elements, such as physical switches 22, 24 and VR agents 36. Configuration nodes 52 keep a persistent copy of the configuration state of SDN controller 32 within state database 56.

Control nodes 54 implement a logically centralized control plane responsible for maintaining ephemeral network state. Control nodes 54 interact with each other and with network elements, such as virtual routers 42 of servers 26, to ensure that the network state is eventually consistent with desired state as specified by orchestration engine 30. In general, control nodes 54 receive configuration state of SDN controller 32 from configuration nodes 32, and exchange routes with each other via IBGP to ensure that all control nodes 54 have the same network state. Further, control nodes 54 exchange routes with VR agents 36 on servers 26 via XMPP. Control nodes 54 communicate the configuration state information, such as routing instances and forwarding policy, to VR agents 36, e.g., via XMPP, for installation within respective virtual routers 42. In some examples, control nodes 54 proxy traffic on behalf of servers 26. These proxy requests may be received over XMPP. Further, control nodes 54 exchange routes with SDN gateway 8 via BGP, and exchange the configuration state of SDN controller 32 with service nodes 21 via Netconf.

Configuration nodes 52 provide a discovery service that customers 4 may use to locate various services available within the network. For example, if VR agent 36A attempts a connection with control node 54A, it uses a discovery service provided by configuration nodes 52 to discover the IP address of control node 54A. Clients executing on VMs 48 may use local configuration, DHCP or DNS to locate the service discovery server within configuration nodes 52.

In some examples, configuration nodes 52 present northbound API that interfaces with orchestration engine 30. Orchestration engine 30 uses this interface to install configuration state using the high-level data model. Configuration nodes 52 further include a message bus to facilitate communications amongst internal components. Configuration nodes 52 further include a transformer that discovers changes in the high-level model of orchestration engine 30 and transforms these changes into corresponding changes in the low level data model managed by SDN controller 32. Configuration nodes 52 further include an IF-MAP server that provides a southbound API to push computed low-level configuration down to control nodes 54. Furthermore, configuration nodes 52 include a distributed applications manager used to allocate unique object identifiers and to implement transactions across data center 10.

According to the techniques of the disclosure, orchestration engine 30 receives an instruction to perform an ISSU of SDN controller 32 from administrator 28. Orchestration engine 30 spawns SDN controller 32' which acts an operating environment for ISSU process 35. SDN controller 32 includes substantially similar elements to SDN controller 32 and includes an upgraded version of the software executing on SDN controller 32, including software upgrades to one or more of analytic nodes 50, configuration nodes 52, or control nodes 54. ISSU process 35 then initializes SDN controller 32'. In some examples, during initialization, ISSU process 35 copies the contents of state database 56 of SDN controller 32 to state database 56' of SDN controller 32'. In further examples, ISSU process 35 uses BGP peering to associate SDN controller 32' with SDN controller 32, such that SDN controller 32' may build a state database 56' substantially similar to state database 56 of SDN controller 32. For example, VR agent 36A transmits messages from VMs 48 to control node 54A of SDN controller 32 and requests that a response to the message be received for the virtual address of the VM 48 that originated the first message. Control node 54A passes this routing information to configuration node 52A, which in turn stores this routing information in state database 56. Because SDN controller 32' is peered to SDN controller 32, it receives identical routing information from BGP communications from VR agent 36A which it may use to build its own state database 56'.

SDN controller 32 and SDN controller 32' do not directly communicate. Rather, SDN controller 32 and SDN controller 32' exchange information via ISSU process 35, or via exchanging communications according to protocols such as BGP. Thus, communication between SDN controller 32 and SDN controller 32' facilitates focused testing of the ISSU of SDN controller 32. Furthermore, SDN controller 32', which may include an upgraded version of software, is not required to maintain backwards compatibility with SDN controller 32. This further facilitates encapsulation and testing of SDN controller 32, SDN controller 32', and ISSU process 35.

In some examples, ISSU process 35 deactivates the northbound API between config nodes 52 of SDN controller 32 and orchestration engine 30. While the northbound API is deactivated, ISSU process 35 synchronizes the states of SDN controller 32 and SDN controller 32' by copying routing, network, and configuration information from state database 56 of SDN controller 32 to state database 52' of SDN controller 32'. ISSU process 35 peers configuration nodes 52A-52N of SDN controller 32 with configuration nodes 52A'-52N' of SDN controller 32'. In some examples, the configuration nodes 52A-52N and 52A'-52N' are BGP peers. ISSU process 35 then reactivates the northbound API between config nodes 52 and orchestration engine 30 so that orchestration engine management of SDN controller 32 may continue, preventing disruption of service to customers 4. Furthermore, because configuration nodes 52A-52N of SDN controller 32 are peered to configuration nodes 52A'-52N' of SDN controller 32', configuration nodes 52A'-52N' may perform runtime synchronization with configuration nodes 52A-52N while SDN controller 32 and SDN controller 32' are actively performing session management.

In some examples, ISSU process 35 migrates each of servers 26 from management by SDN controller 32 to management by SDN controller 32'. For example, for each of servers 26, ISSU process 35 deactivates the southbound link between compute nodes 54 of SDN controller 32 and the corresponding server, and establish a new southbound link between the server and control nodes 54' of SDN controller 32'. Each of VR agents 36 updates forwarding and routing information stored by the corresponding NFT 44 such that messages are forwarded to control nodes 54' of SDN controller 32' instead of control nodes 54 of SDN controller 32.

In some examples, after ISSU process 35 has migrated servers 26 managed by SDN controller 32 to SDN controller 32', ISSU process 35 deactivates the northbound API between the config nodes 52 of SDN controller 32 and orchestration engine 30 for a second time. ISSU process 35 ensures that all relevant state information has been transferred from state database 56 of SDN controller 32 to state database 56' of SDN controller 32'. ISSU process 35 establishes a new northbound API between config nodes 52' of SDN controller 32' and orchestration engine 30. The ISSU process deactivates analytic nodes 50, config nodes 52, and control nodes 54 of SDN controller 32 and deallocates their resources. At this point, ISSU process 35 ends and normal operations within data center 10 may continue. Thus it may be seen that, according to the techniques of the present disclosure, a data center may perform an upgrade of an SDN controller while maintaining service to its customers, therefore minimizing service downtime and interruptions to its customers.

The architecture of data center 10 illustrated in FIG. 3 is shown for exemplary purposes only. The techniques as set forth in this disclosure may be implemented in the example data center 10 of FIG. 3, as well as other types of data centers not described specifically herein. Nothing in this disclosure should be construed so as to limit the techniques of this disclosure to the example architecture illustrated by FIG. 3.

Figure 4:
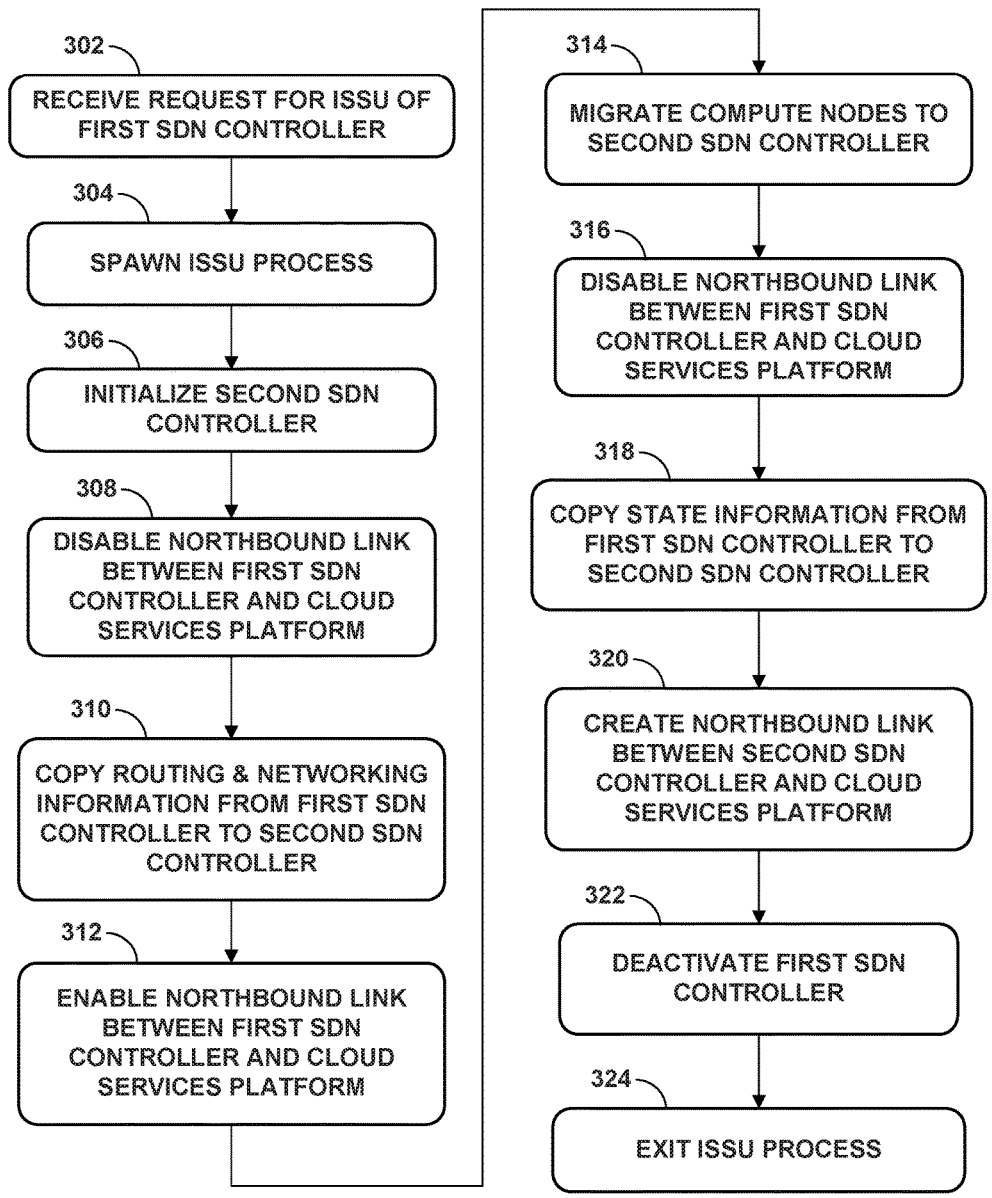
FIG. 4 is a flowchart illustrating an example method for performing an ISSU of an SDN controller according to techniques of the disclosure.

FIG. 4 is flowchart illustrating the example techniques described herein for performing an ISSU of SDN controller 32 according to techniques of the disclosure. FIGS. 5A-5D provide a sequence of block diagrams that are used to illustrate the ISSU process. For purpose of example, the flowchart of FIG. 4 and the sequence of block diagrams of 5A-5D are described in reference to the example data center of FIGS. 1-3.

Figure 5A:
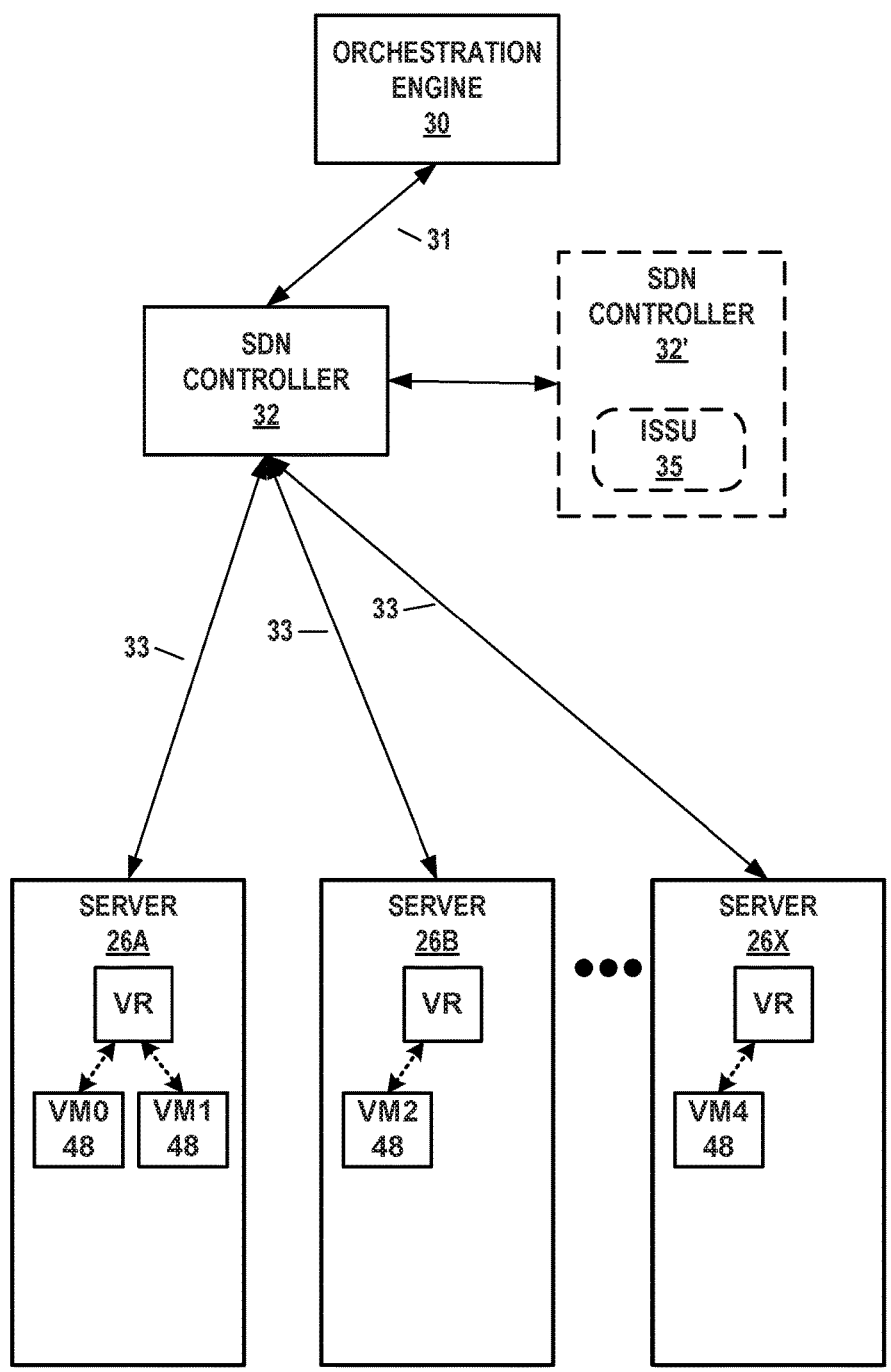
FIG. 5A is a block diagram illustrating the example method of FIG. 4 for performing an ISSU of an SDN controller according to techniques of the disclosure.

As shown in the flowchart of FIG. 4, orchestration engine 30 within data center 10 receives an instruction to perform an ISSU of SDN controller 32 (302) from administrator 28. For example, administrator 28 may interact with orchestration engine by way of a user interface or a network management protocol to indicate that an in-service software upgrade of SDN controller 32 is desired. In response, orchestration engine 30 spawns SDN controller 32', containing ISSU process 35, to begin the ISSU of SDN controller 32 (304). ISSU process 35 initializes virtual SDN controller 32', wherein SDN controller 32' has an upgraded version of the software executing on SDN controller 32 (306). As examples, this software may include one or more updated or upgraded software features of analytic nodes 50, configuration nodes 52, and control nodes 54. During initialization, ISSU process 35 configures SDN controller 32' to operate in parallel with SDN controller 32 such that SDN controller 32' receives networking and routing information sent to SDN controller 32 from servers 26. SDN controller 32' uses this received information to build a state database 56' substantially similar to state database 56 of SDN controller 32. In some examples, SDN controller 32 and SDN controller 32' are configured to operate in parallel by configuring them to operate as BGP peers such that SDN controller 32 announces routing information to SDN controller 32' by way of a BGP peering session. As such, SDN controller 32 and SDN controller 32' maintain synchronized routing and forwarding tables information bases, e.g., routing tables and forward information. FIG. 5A illustrates the point in time during the ISSU process where the second SDN controller 32' has been spawned and a routing protocol peering session has been established between SDN controllers 32, 32'.

Next, ISSU process 35 deactivates northbound API 31 between SDN controller 32 and orchestration engine 30 to ensure that state database 56 of SDN controller 32 remains static. For example, ISSU process 35 issues instructions to orchestration engine 30 causing orchestration engine 30 to disable communications with configuration nodes 52 of SDN controller 32. In other examples, ISSU process 35 issues instructions to orchestration engine 30 causing orchestration engine 30 to delete routing information to SDN controller 32 from a table of routing and networking information. During this time, ISSU process 35 process copies routing, network, and configuration information from state database 56 of SDN controller 32 to state database 56' of SDN controller 32' to ensure that state information within SDN controller 32 is migrated to SDN controller 32' (310). For example, ISSU process 35 accesses state database 56 of SDN controller 32 and state database 56' of SDN controller 32' and executes instructions to directly copy data from state database 56 to state database 56'.

Figure 5B:
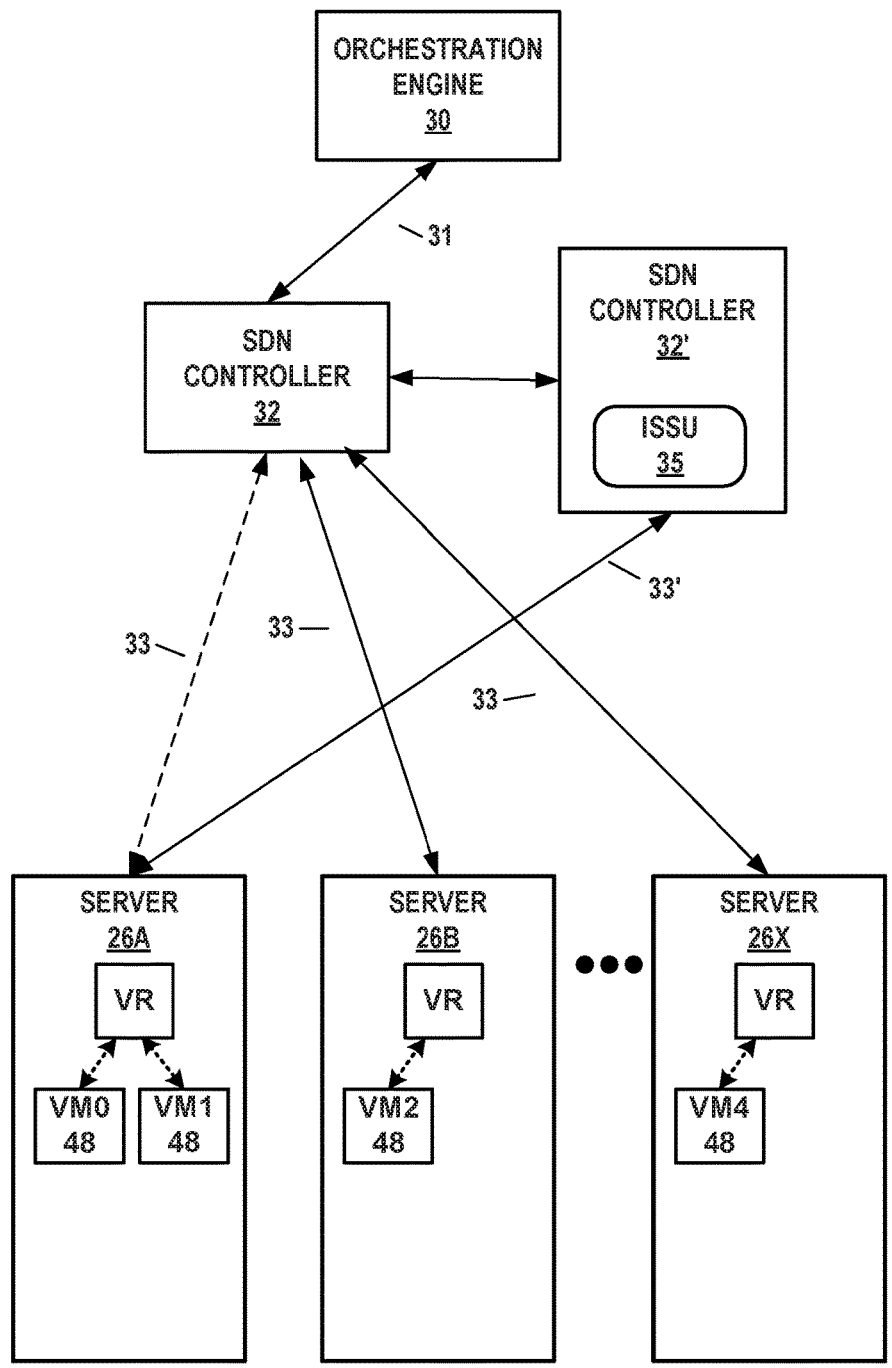
FIG. 5B is a block diagram illustrating the example method of FIG. 4 for performing an ISSU of an SDN controller according to techniques of the disclosure.

After the state data is migrated, ISSU process 35 peers configuration nodes 52A-52N of SDN controller 32 with configuration nodes 52A'-52N' of SDN controller 32'. In some examples, the configuration nodes 52A-52N and 52A'-52N' are BGP peers. ISSU process 35 reactivates northbound API 31 between config nodes 52 of SDN controller 52 and orchestration engine 30 so that orchestration engine management of SDN controller 32 may resume, minimizing the time that SDN controller 32 is unable to receive instructions from orchestration engine 30 (312). For example, ISSU process 35 issues instructions to orchestration engine 30 to reestablish northbound API 31 between config nodes 52 of SDN controller 52 and orchestration engine 30 to resume normal operations. In other words, at this stage in the ISSU process, SDN controller 32 is restored to full operation and control of network virtualization and data flow within data center 10. At this point, all existing virtual routers within servers 26 remain under the control of original SDN controller 32 and all network operations continue uninterrupted. Moreover, SDN controller 32' is also fully operational as a redundant SDN controller that is synchronized to SDN controller 32 by way of a BGP peering session. Furthermore, because configuration nodes 52A-52N of SDN controller 32 are peered to configuration nodes 52A'-52N' of SDN controller 32', configuration nodes 52A'-52N' may perform runtime synchronization with configuration nodes 52A-52N while SDN controller 32 and SDN controller 32' are actively performing session management. Thus, both SDN controller 32 and SDN controller 32' may operate in parallel to perform session, routing, and network management for customers 4, servers 26, and virtual routers 42. In this way, data center 10 minimizes the time that northbound API 31 is down to only the time required to synchronize state database 56 and state database 56'. Accordingly, the amount of downtime due to an absence of communication between orchestration network 30 and SDN controller 32 is minimized, thus mitigating any potential service disruptions to customers 4 during the ISSU process. FIG. 5B provides a block diagram illustrating the components of data center 10 at this stage of the ISSU process.

ISSU process 35 selectively performs a software upgrade on each of servers 26. In some examples, ISSU process 35 installs the newest or latest version of software on each of servers 26 consecutively, so as to facilitate testing and validation of the software upgrade. In other examples, ISSU process 25 performs the software upgrade on a subgroup of servers 26, so as to test the software upgrade prior to installing the software upgrade on all of servers 26. For example, ISSU process 35 upgrades server 26A and performs validation and testing of the software upgrade. If the testing and validation determines that the software upgrade is stable and functions as intended, ISSU process 35 may proceed to roll out the software upgrade to servers 26B-26X. In some examples, each of servers 26 is upgraded simultaneously, so as to facilitate large-scale upgrading and updating of servers 26. For example, upgrading all of servers 26 simultaneously may be more efficient when the software upgrade has already been thoroughly tested and validated, and there is no need for testing on individual servers.

Figure 5C:
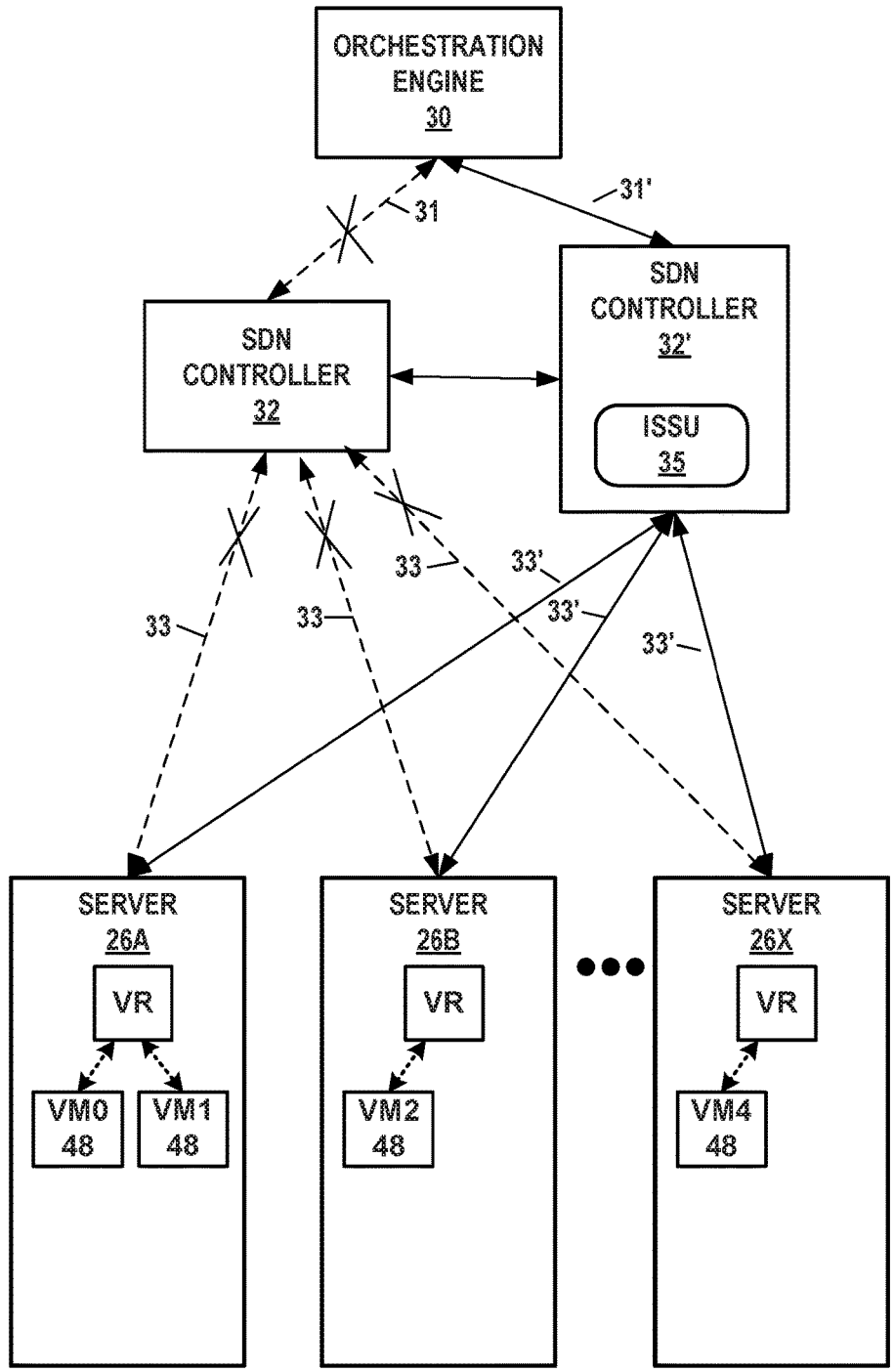
FIG. 5C is a block diagram illustrating the example method of FIG. 4 for performing an ISSU of an SDN controller according to techniques of the disclosure.

After performing the software upgrade of servers 26, ISSU process 35 reconfigures the virtual router agents within each of servers 26 so as to selectively migrate each of the servers 26 from management by SDN controller 32 to management by SDN controller 32' (314). For example, as servers 26 are sequentially transitioned, ISSU process 35 deactivates the respective southbound link 33 between SDN controller 32 and the corresponding virtual router of the server (see FIG. 5C), and establishes a new southbound link 33' between the corresponding virtual router of the server and SDN controller 32'. For example, ISSU process 35 accesses each virtual router 42 of servers and issues instructions causing virtual routers 42 to switch from querying control nodes 54 of SDN controller 52 for discovery and routing services to querying control nodes 54' of SDN controller 52' for these services. In doing so, at each stage of the migration, any given virtual router agent executing within servers 26 maintains a connection to either SDN controller 32 or SDN controller 32, ensuring that customer traffic flow and customer applications executing on the virtual machines within servers 26 remain available and uninterrupted. Thus, customers 4 may continue to access applications and services executing on VMs 48 of servers 26 during the ISSU process, without experiencing interruptions or delays in service. FIG. 5C provides a block diagram at this stage of the ISSU process where each of the virtual routers have been reconfigured so as to be under the control of SDN controller 32'. Although not controlling data flow services for any particular servers 26, SDN controller 32 remains fully operational and connected to orchestration engine 30.

After ISSU process 35 has migrated servers 26 managed by SDN controller 32 to management by SDN controller 32' by reconfiguring the virtual routers, ISSU process 35 deactivates northbound API 31 between the SDN controller 32 and orchestration engine 30 for a second time (316). As discussed above, ISSU process 35 may issue instructions to orchestration engine 30 causing orchestration engine 30 to remove routing information for SDN controller 32 or to disable interfaces with SDN controller 32. See, for example, FIG. 5C where northbound API 31 of SDN controller 32 is deactivated. During this time, ISSU process 35 process, for a second time, copies routing, network, and configuration information from state database 56 of SDN controller 32 to state database 56' of SDN controller 32' to ensure that state information within SDN controller 32 has been migrated to SDN controller 32' (318). As discussed above, ISSU process 35 accesses state database 56 of SDN controller 32 and state database 56' of SDN controller 32' and executes instructions to directly copy data from state database 56 to state database 56'. In other examples, ISSU process 35 accesses state database 56 and determines if new information has been added to state database 56 since the last synchronization operation, and only copy these files to state database 56'. This is done to ensure that that no networking and routing information known to SDN controller 32 is lost during the migration to SDN controller 32'. After the state data is copied, ISSU process 35 establishes a new northbound API 33' between SDN controller 32' and orchestration engine 30 such that orchestration engine 30 may begin management of SDN controller 32' (320). As discussed above, ISSU process 35 may issue instructions to orchestration engine 30 causing orchestration engine 30 to add routing information for SDN controller 32' or to create interfaces with SDN controller 32'. In this way, data center 10 minimizes the time that communication between orchestration engine 30 and an SDN controller is unavailable to only the time required to synchronize state database 56 and state database 56' and create a new northbound API 31' between orchestration engine 30 and SDN controller 32'. Accordingly, the amount of downtime due to an absence of communication between orchestration network 30 and SDN controller 32 or SDN controller 32' is minimized, thus mitigating any potential service disruptions to customers 4 during the ISSU process.

Figure 5D:
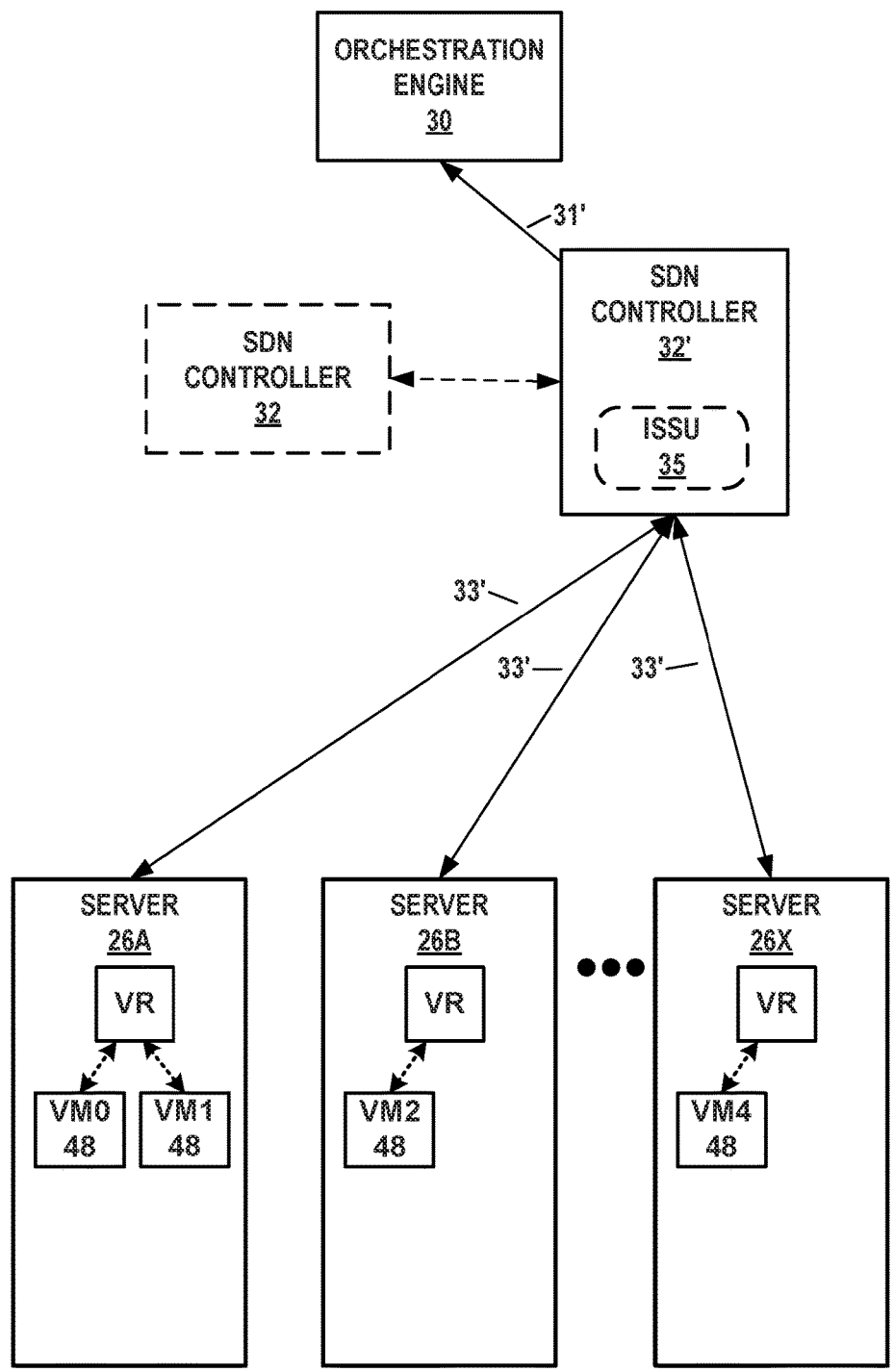
FIG. 5D is a block diagram illustrating the example method of FIG. 4 for performing an ISSU of an SDN controller according to techniques of the disclosure.

At this stage, SDN controller 32' now has taken over all functions previously performed by SDN controller 32. ISSU process 35 deactivates SDN controller 32 and deallocates its resources (322). At this point, ISSU process 35 has completed execution, and normal operations within data center 10 may continue (324). SDN controller 32' operates in the place of SDN controller 32, but with the desired software upgrade. Thus it may be seen that, according to the techniques of the present disclosure, a data center may perform an ISSU of an SDN controller while maintaining service to its customers, therefore minimizing service downtime and interruptions to its customers. FIG. 5D illustrates the final stage of the ISSU process where SDN controller 32' is has full operation responsibility and control for virtualized network operations and data flows for customer virtual networks within data center 10.

In some examples, administrator 28 issues instructions to ISSU process 35 to undo the ISSU process performed on SDN controller 32 and servers 26. For example, if the ISSU is unstable, or does not otherwise function as intended, administrator 28 may issue instructions to ISSU process 35 to roll back or remove the ISSU. In response to receiving the instructions, ISSU process 35 reverts management of servers 26 from SDN controller 32' back to SDN controller 32. ISSU process 35 also removes any software upgrades performed on servers 26 and reverts servers 26 to a previous software installation. Thus, administrator 28 retains the ability to remove the ISSU performed on SDN controller 32 if the ISSU process or SDN controller 32' do not function as planned.

The example method illustrated in FIGS. 4 and 5A-5D are shown for exemplary purposes only. The techniques as set forth in this disclosure may be implemented in the example method of FIGS. 4 and 5A-5D, as well as other methods not described specifically herein. Nothing in this disclosure should be construed so as to limit the techniques of this disclosure to the example method illustrated by FIGS. 4 and 5A-5D.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    on at least one processor of a cloud data center executing a first Software Defined Networking (SDN) controller configured to perform session management of a plurality of session instances, wherein the cloud data center further comprises:
        an orchestration engine communicatively coupled to the first SDN controller via a first northbound application program interface (API); and
        a plurality of compute nodes configured to perform compute functions for the plurality of session instances, wherein each of the plurality of compute nodes comprise:
            a virtual router, wherein each virtual router is communicatively coupled to the first SDN controller via a southbound API; and
            at least one virtual machine configured to execute at least one session instance of the plurality of session instances:
    in response to receiving a request to perform an in-service software upgrade (ISSU) of the first SDN controller:
        initializing a second SDN controller on the cloud data center;
        establishing a peering session between the first SDN controller and the second SDN controller;
        concurrently receiving, by each of the first SDN controller and the second SDN controller, networking and routing information for the plurality of session instances; and
        using, by the second SDN controller, the networking and routing information for the plurality of session instances to build a state database for the second SDN controller while the first SDN controller uses the networking and routing information for the plurality of session instances to perform session management of the plurality of session instances; and
        after initializing the second SDN controller and building the state database for the second SDN controller, transferring session management for the plurality of session instances from the first SDN controller to the second SDN controller.

2. The method of claim 1, wherein transferring session management for the plurality of session instances from the first SDN controller to the second SDN controller comprises:
    for each session instance of the plurality of session instances, performing session management by the first SDN controller and switching to performing session management by the second SDN controller without interrupting execution of the session instance.

3. The method of claim 2, wherein performing session management by the first SDN controller and switching to performing session management by the second SDN controller without interrupting execution of the session instance comprises, for each compute node of the plurality of compute nodes:
    performing, by the at least one processor, a software upgrade on the compute node; and
    after performing the software upgrade on the compute node, reconfiguring, by the at least one processor, the southbound API of the virtual router to communicate with the second SDN controller instead of the first SDN controller.

4. The method of claim 1, further comprising, after transferring session management for the plurality of session instances from the first SDN controller to the second SDN controller, deactivating the first SDN controller without interrupting session management of the plurality of session instances.

5. A method comprising:
    on at least one processor of a cloud data center executing a first Software Defined Networking (SDN) controller configured to perform session management of a plurality of session instances, wherein the cloud data center further comprises:
        an orchestration engine communicatively coupled to the first SDN controller via a first northbound application program interface (API); and
        a plurality of compute nodes configured to perform compute functions for the plurality of session instances, wherein each of the plurality of compute nodes comprise:
            a virtual router, wherein each virtual router is communicatively coupled to the first SDN controller via a southbound API; and
            at least one virtual machine configured to execute at least one session instance of the plurality of session instances:
    in response to receiving a request to perform an in-service software upgrade (ISSU) of the first SDN controller, initializing a second SDN controller on the cloud data center; after initializing the second SDN controller, transferring session management for the plurality of session instances from the first SDN controller to the second SDN controller, wherein initializing the second SDN controller on the cloud data center comprises:
        disabling the first northbound API between the first SDN controller and the orchestration engine;
        while the first northbound API is disabled, synchronizing a first state database of the first SDN controller with a second state database of the second SDN controller;

after the first state database and second state database are synchronized, peering a plurality of configuration nodes of the first SDN controller with a plurality of configuration nodes of the second SDN controller; and after peering the plurality of configuration nodes of the first SDN controller with the plurality of configuration nodes of the second SDN controller, reenabling the first northbound API between the first SDN controller and the orchestration engine to allow run-time synchronization of the plurality of configuration nodes of the first SDN controller with the plurality of configuration nodes of the second SDN controller.

6. A method comprising:

on at least one processor of a cloud data center executing a first Software Defined Networking (SDN) controller configured to perform session management of a plurality of session instances, wherein the cloud data center further comprises:
  an orchestration engine communicatively coupled to the first SDN controller via a first northbound application program interface (API); and
  a plurality of compute nodes configured to perform compute functions for the plurality of session instances, wherein each of the plurality of compute nodes comprise:
    a virtual router, wherein each virtual router is communicatively coupled to the first SDN controller via a southbound API; and
    at least one virtual machine configured to execute at least one session instance of the plurality of session instances;

in response to receiving a request to perform an in-service software upgrade (ISSU) of the first SDN controller, initializing a second SDN controller on the cloud data center; after initializing the second SDN controller, transferring session management for the plurality of session instances from the first SDN controller to the second SDN controller; and after transferring session management for the plurality of session instances from the first SDN controller to the second SDN controller:
  disabling the first northbound API between the first SDN controller and the orchestration engine;
  while the first northbound API is disabled, synchronizing a first state database of the first SDN controller with a second state database of the second SDN controller; and
  after the first state database and second state database are synchronized, activating a second northbound API between the second SDN controller and the orchestration engine.

7. A second Software Defined Networking (SDN) controller executing on at least one processor of a cloud data center, configured to:

receive a request, from an orchestration engine, to perform an in-service software upgrade (ISSU) of a first SDN controller executing on the at least one processor, wherein the orchestration engine is communicatively coupled to the first SDN controller via a first northbound application program interface (API), the first SDN controller is configured to perform session management of a plurality of session instances, and the cloud data center further comprises:
  a plurality of compute nodes configured to perform compute functions for the plurality of session instances, wherein each of the plurality of compute nodes comprise:
    a virtual router, wherein each virtual router is communicatively coupled to the first SDN controller via a southbound API; and
    at least one virtual machine configured to execute at least one session instance of the plurality of session instances; and in response to receiving the request, execute an ISSU process configured to:
  initialize the second SDN controller on the cloud data center;
  establish a peering session between the first SDN controller and the second SDN controller;
  cause each of the first SDN controller and the second SDN controller to concurrently receive networking and routing information for the plurality of session instances; and
  cause the second SDN controller to use the networking and routing information for the plurality of session instances to build a state database for the second SDN controller while the first SDN controller uses the networking and routing information for the plurality of session instances to perform session management of the plurality of session instances; and
  after initializing the second SDN controller and building the state database for the second SDN controller, transfer session management for the plurality of session instances from the first SDN controller to the second SDN controller.

8. The second SDN controller of claim 7, wherein the ISSU process configured to transfer session management for the plurality of session instances from the first SDN controller to the second SDN controller is further configured to:
  for each session instance of the plurality of session instances, switch from performing session management 1a the first SDN controller to performing session management by the second SDN controller without interrupting execution of the session instance.

9. The second SDN controller of claim 8, wherein the ISSU process configured to switch from performing session management from the first SDN controller to performing session management by the second SDN controller without interrupting execution of the session instance is further configured to, for each compute node of the plurality of compute nodes:
  perform a software upgrade on the compute node; and
  after performing the software upgrade on the compute node, reconfigure the southbound API of the virtual router of the compute node to communicate with the second SDN controller instead of the first SDN controller.

10. The second SDN controller of claim 7, wherein, after transferring session management for the plurality of session instances from the first SDN controller to the second SDN controller, the ISSU process is configured to deactivate the first SDN controller without interrupting session management of the plurality of session instances.

11. A second Software Defined Networking (SDN) controller executing on at least one processor of a cloud data center, configured to:
  receive a request, from an orchestration engine, to perform an in-service software upgrade (ISSU) of a first SDN controller executing on the at least one processor, wherein the orchestration engine is communicatively coupled to the first SDN controller via a first northbound application program interface (API), the first SDN controller is configured to perform session management of a plurality of session instances, and the cloud data center further comprises:
  a plurality of compute nodes configured to perform compute functions for the plurality of session instances, wherein each of the plurality of compute nodes comprise:
    a virtual router, wherein each virtual router is communicatively coupled to the first SDN controller via a southbound API; and
    at least one virtual machine configured to execute at least one session instance of the plurality of session instances; and
  in response to receiving the request, execute an ISSU process configured to:
    initialize the second SDN controller on the cloud data center;
    after initializing the second SDN controller, transfer session management for the plurality of session instances from the first SDN controller to the second SDN controller,
  wherein, to initialize the second SDN controller, the ISSU process is further configured to:
    disable the first northbound API between the first SDN controller and the orchestration engine;
    while the first northbound API is disabled, synchronize a first state database of the first SDN controller with a second state database of the second SDN controller;
    after the first state database and second state database are synchronized, peer a plurality of configuration nodes of the first SDN controller with a plurality of configuration nodes of the second SDN controller; and
    after peering the plurality of configuration nodes of the first SDN controller with the plurality of configuration nodes of the second SDN controller, reenable the first northbound API between the first SDN controller and the orchestration engine to allow run-time synchronization of the plurality of configuration nodes of the first SDN controller with the plurality of configuration nodes of the second SDN controller.

12. A second Software Defined Networking (SDN) controller executing on at least one processor of a cloud data center, configured to:
  receive a request, from an orchestration engine, to perform an in-service software upgrade (ISSU) of a first SDN controller executing on the at least one processor, wherein the orchestration engine is communicatively coupled to the first SDN controller via a first northbound application program interface (API), the first SDN controller is configured to perform session management of a plurality of session instances, and the cloud data center further comprises:
    a plurality of compute nodes configured to perform compute functions for the plurality of session instances, wherein each of the plurality of compute nodes comprise:
      a virtual router, wherein each virtual router is communicatively coupled to the first SDN controller via a southbound API; and
      at least one virtual machine configured to execute at least one session instance of the plurality of session instances; and
  in response to receiving the request, execute an ISSU process configured to:
    initialize the second SDN controller on the cloud data center; and
    after initializing the second SDN controller, transfer session management for the plurality of session instances from the first SDN controller to the second SDN controller,
  wherein the ISSU process is further configured to, after transferring session management for the plurality of session instances from the first SDN controller to the second SDN controller:
    disable the first northbound API between the first SDN controller and the orchestration engine;
    while the first northbound API is disabled, synchronize a first state database of the first SDN controller with a second state database of the second SDN controller; and
    after the first state database and second state database are synchronized, activate a second northbound API between the second SDN controller and the orchestration engine.

13. A non-transitory computer-readable medium comprising instructions for causing at least one programmable processor of a second Software Defined Networking (SDN) controller of a cloud data center to:
  receive a request, from an orchestration engine, to perform an in-service software upgrade (ISSU) of a first SDN controller, wherein the orchestration engine is communicatively coupled to the first SDN controller via a first northbound application program interface (API), the first SDN controller is configured to perform session management of a plurality of session instances, and the cloud data center further comprises:
    a plurality of compute nodes configured to perform compute functions for the plurality of session instances, wherein each of the plurality of compute nodes comprise:
      a virtual router, wherein each virtual router is communicatively coupled to the first SDN controller via a southbound API; and
      at least one virtual machine configured to execute at least one session instance of the plurality of session instances;
  in response to receiving the request, execute an ISSU process configured to:
    initialize the second SDN controller on the cloud data center;
    establish a peering session between the first SDN controller and the second SDN controller;
    cause each of the first SDN controller and the second SDN controller to concurrently receive networking and routing information for the plurality of session instances; and
    cause the second SDN controller to use the networking and routing information for the plurality of session instances to build a state database for the second SDN controller while the first SDN controller uses the networking and routing information for the plurality of session instances to perform session management of the plurality of session instances; and
    after initializing the second SDN controller and building the state database for the second SDN controller, transfer session management for the plurality of session instances from the first SDN controller to the second SDN controller.

14. The non-transitory computer-readable medium of claim 13, wherein the instructions for causing the ISSU process to transfer session management for the plurality of session instances from the first SDN controller to the second SDN controller are further configured to cause the second SDN controller to:

for each session instance of the plurality of session instances, switch from performing session management 1a the first SDN controller to performing session management by the second SDN controller without interrupting execution of the session instance.

15. The non-transitory computer-readable medium of claim 14, wherein the instructions for causing the ISSU process to switch from performing session management 1a the first SDN controller to performing session management by the second SDN controller without interrupting execution of the session instance are further configured to cause the second SDN controller to, for each compute node of the plurality of compute nodes:

perform a software upgrade on the compute node; and after performing the software upgrade on the compute node, reconfigure the southbound API of the virtual router of the compute node to communicate with the second SDN controller instead of the first SDN controller.

16. The non-transitory computer-readable medium of claim 13, wherein the instructions for causing the ISSU process to initialize the second SDN controller are further configured to cause the ISSU process to:

disable the first northbound API between the first SDN controller and the orchestration engine;

while the first northbound API is disabled, synchronize a first state database of the first SDN controller with a second state database of the second SDN controller;

after the first state database and second state database are synchronized, peer a plurality of configuration nodes of the first SDN controller with a plurality of configuration nodes of the second SDN controller; and after peering the plurality of configuration nodes of the first SDN controller with the plurality of configuration nodes of the second SDN controller, reenable the first northbound API between the first SDN controller and the orchestration engine to allow run-time synchronization of the plurality of configuration nodes of the first SDN controller with the plurality of configuration nodes of the second SDN controller.

17. The non-transitory computer-readable medium of claim 13, wherein the instructions are further configured to cause the ISSU process to, after transferring session management for the plurality of session instances from the first SDN controller to the second SDN controller:

disable the first northbound API between the first SDN controller and the orchestration engine;

while the first northbound API is disabled, synchronize a first state database of the first SDN controller with a second state database of the second SDN controller; and after the first state database and second state database are synchronized, activate a second northbound API between the second SDN controller and the orchestration engine.

* * * * *

UNITED STATES PATENT AND TRADEMARK OFFICE
CERTIFICATE OF CORRECTION

PATENT NO. : 10,083,026 B1
APPLICATION NO. : 15/087286
DATED : September 25, 2018
INVENTOR(S) : Suresh Kumar Vinapamula Venkata et al.

Page 1 of 1

It is certified that error appears in the above-identified patent and that said Letters Patent is hereby corrected as shown below:

In the Claims

Column 20, Line 39 (Claim 8): Replace "1a the first" with --by the first--

Column 23, Line 9 (Claim 14): Replace "1a the first" with --by the first--

Column 23, Line 14 (Claim 15): Replace "management 1a" with --management by--

Signed and Sealed this
Sixteenth Day of April, 2019

Andrei Iancu
*Director of the United States Patent and Trademark Office*